United States Patent
Bursack et al.

[15] 3,658,658
[45] Apr. 25, 1972

[54] SEPARATION AND RECOVERY OF 1,1,1-TRICHLOROETHANE BY EXTRACTIVE DISTILLATION

[72] Inventors: Kenneth F. Bursack, Wichita; Earnest L. Johnston, Clearwater, both of Kans.

[73] Assignee: Vulcan Materials Company, Birmingham, Ala.

[22] Filed: Oct. 1, 1969

[21] Appl. No.: 862,950

[52] U.S. Cl. ........................203/58, 203/60, 203/63, 260/652 P
[51] Int. Cl. ........................B01d 3/34
[58] Field of Search.................203/50.55, 56, 57, 58, 62, 203/63, 64, 70, 98, 99, 51, 60; 260/652, 654, 658, 658 P, 653.7, 653.8, 652 P, 654 S, 660, 662 R, 658 R, 659 R

[56] References Cited

UNITED STATES PATENTS

| | | | |
|---|---|---|---|
| 3,113,079 | 12/1963 | Bergeron et al. | 203/58 |
| 2,588,056 | 3/1952 | Teter et al. | 203/57 X |
| 2,106,158 | 1/1938 | Povenz et al. | 260/652 |
| 3,152,968 | 10/1964 | Haemmerlen et al. | 203/55 X |
| 2,357,028 | 8/1944 | Shiras et al. | 260/652 P |
| 3,059,035 | 10/1962 | Benner et al. | 260/658 |

OTHER PUBLICATIONS

Industrial and Engineering Chemistry Extractive Distillation etc., Nov. 1954, pp. 2396–2399.

*Primary Examiner*—Wilbur L. Bascomb, Jr.
*Attorney*—Burns, Doane, Benedict, Swecker & Mathis

[57] ABSTRACT

1,1,1-Trichloroethane containing chlorohydrocarbon contaminants, principally 1,2-dichloroethane, is purified by extractive distillation, employing as an extraction solvent either n-butyronitrile, or tetrahydrofurfuryl alcohol.

6 Claims, No Drawings

SEPARATION AND RECOVERY OF 1,1,1-TRICHLOROETHANE BY EXTRACTIVE DISTILLATION

BACKGROUND OF THE INVENTION

The chlorinated hydrocarbon 1,1,1-trichloroethane, $CH_3CCl_3$, also, known as methylchloroform, is used extensively as a nonflammable solvent for degreasing, for cold type metal cleaning, and for cleaning plastic molds. It may be prepared by the thermal chlorination of ethane, or by the action of chlorine on 1,1-dichloroethane, or by the catalystic addition of HCl to 1,1-dichloroethylene. It boils at 74°–75° C. at atmospheric pressure, and has a specific gravity of 1.3492.

In the manufacture of 1,1,1-trichloroethane, various chlorinated hydrocarbons appear as by-products or co-products of the reaction, forming small amounts of impurities in the 1,1,1-trichloroethane, from which they are separable by distillation techniques only with great difficulty and expense. A by-product chlorinated compound of which this is particularly true is 1,2-dichloroethane, $ClCH_2CH_2Cl$, also known as ethylene dichloride, which has a boiling point of 83°–84° C. and a specific gravity of 1.255. As the proportion of 1,1,1-trichloroethane in a mixture of this compound with 1,2-dichloroethane increases, the separation of the two compounds by simple distillation becomes increasingly difficult. This is especially true in concentration ranges of 1,1,1-trichloroethane in excess of 90 weight percent. On the basis of experimentally determined vapor-liquid equilibrium data, a commercial process for the satisfactory separation of these two compounds would require in excess of 160 trays in distillation columns, which is impractical economically.

The practical difficulty of attempting to separate 1,1,1-trichloroethane from 1,2-dichloroethane by fractional distillation alone can be demonstrated on a laboratory scale. Thus, a 40-tray vacuum-jacketed Oldershaw column was charged with four liters of a mixture of 99 weight percent 1,1,1-trichloroethane and 1 percent 1,2-dichloroethane. The column was operated batchwise for in excess of 50 hours at a reflux ratio of 100:1. Simultaneous overhead and bottoms samples were taken and analyzed by gas chromatography. The bottoms product showed 99.04 weight percent 1,1,1-trichloroethane and 0.96 weight percent 1,2-dichloroethane. The overhead product still contained 0.10 weight percent of 1,2-dichloroethane. The calculated relative volatility of the trichloro compound to the dichloro compound was 1.08.

In Table 1 below there are set forth in Examples I–IV the results of similar tests made with a vapor-liquid equilibrium still, employing various proportions of trichloro compound and dichloro compound. The relative volatility obtained in Example IV agrees closely with the figure 1.08 obtained as described above.

GENERAL DESCRIPTION OF THE INVENTION

In accordance with the present invention there is provided a novel method for the separation of 1,1,1-trichloroethane from mixtures thereof with 1,2-dichloroethane and/or other chlorinated hydrocarbon impurities, which employs the principle of extractive distillation. In extractive distillation, an auxiliary solvent that forms a nonideal solution with the mixture to be separated is introduced as a second feed at a suitable point of the distillation column. The extraction solvent is one which is also capable of altering the volatility of the desired component of the mixture, by reducing its vapor pressure relative to that of the other components or impurities. The bottoms then consist of the undesired components and the solvent. The latter may be separated in a second column under conditions such that the degree of association between the solvent and the undesired components is reduced, and the solvent can be recovered and reused.

It has been found, in accordance with the invention, that the separation and recovery of 1,1,1-trichloroethane from other chlorohydrocarbons, and particularly from 1,2-dichloroethane, may be successfully performed, using the techniques of extractive distillation, by adding to a mixture of the 1,1,1-trichloroethane and other chlorohydrocarbons, an extraction solvent which is one of the following compounds: tetrahydrofurfuryl alcohol, 1-nitropropane, epichlorohydrin, and n-butyronitrile.

The effective proportion of the foregoing extraction solvents to be employed relative to the 1,1,1-trichloroethane is not critical, and may be varied within wide limits, depending upon the type and design of the distillation column, the nature of the solvent and of the impurity or impurities to be removed, distillation conditions, and other variables. Advantageously, however, an amount of solvent is employed ranging from about 25 percent to about 85 percent by weight based on total liquid composition, the optimum concentration depending somewhat upon the particular solvent used and the particular chlorohydrocarbon impurity to be removed. Preferably the solvent concentration lies between about 45 percent and about 70 percent by weight.

The foregoing solvents have been suggested in the prior art as stabilizers for chlorohydrocarbons of various types, but the amount used for that purpose is very small, generally 1 percent by weight or less. The proportions required for extractive distillation purposes are far in excess of this stabilizing amount. However, when employed as extraction solvents in accordance with the invention, the aforementioned compounds may also manifest an incidental beneficial stabilizing action.

The extractive solvents employed in the practice of the invention are stable under distillation conditions and are easily separated from the various chlorinated hydrocarbon impurities present in the mixture to be purified.

In carrying out the extractive distillation of 1,1,1-trichloroethane in accordance with the invention, the extraction solvent is advantageously introduced in a continuous stream near the top of the distillation column. The 1,1,1-trichloroethane-chlorohydrocarbon mixture is introduced continuously at a lower level in the column. The 1,1,1-trichloroethane enriched product is continuously removed from one of the trays located above the feed tray for the extraction solvent. The relative locations of the feed and product removal trays depend upon the particular solvent employed. The 1,2-dichloroethane enriched solvent product is removed at the bottom of the column. This bottoms product is then sent to an auxiliary column to recover the 1,2-dichloroethane and the extraction solvent, and the latter is recycled to the extractive distillation column. A slight purge stream removes heavy ends from the bottom of the auxiliary column.

DESCRIPTION OF THE PREFERRED EMBODIMENTS

The following examples illustrate the presently preferred practice of the process of the invention, but are not to be regarded as limiting.

In Table 1 there are summarized the results of tests performed with a vapor-liquid equilibrium still, showing the calculated relative volatility values for 1,1,1-trichloroethane in relation to 1,2-dichloroethane, where no extraction solvent was used, as well as for various extraction solvents and concentrations of the components in the mixtures. Examples I–IV show the relative volatility calculated from the equilibrium still data for the system 1,1,1-trichloroethane/1,2-dichloroethane, with no extraction solvent present. Examples V–VIII show the results obtained employing each of the extraction solvents: 1-nitropropane, epichlorohydrin, n-butyronitrile, and tetrahydrofurfuryl alcohol. Examples IX–XI show the effect of varying the proportion of solvent. Thus, Example IX shows the effect of a higher concentration of 1,1,1-trichloroethane relative to 1,2-dichloroethane with tetrahydrofurfuryl alcohol as the extraction solvent. Example X indicates the effect of lowering the concentration of extraction solvent in the mixture. This effect is brought out even more clearly by comparison of Example X with Example XI.

TABLE 1

Extractive distillation separation of 1,1,1-trichloroethane from 1,2-dichloroethane (Vapor-liquid equilibrium still data)

| Example number | Extractant | Liquid phase composition, wt. percent | | | Relative volatility [1] | Pressure, mm. Hg |
|---|---|---|---|---|---|---|
| | | Extractant | 1,1,1-tri | 1,2-di | | |
| I | None | | 70.06 | 29.94 | 1.20 | 730.3 |
| II | do | | 79.11 | 20.89 | 1.16 | 729.7 |
| III | do | | 96.80 | 3.20 | 1.10 | 727.6 |
| IV | do | | 99.24 | 0.76 | 1.08 | 726.4 |
| V | 1-nitropropane | 71.04 | 26.96 | 2.00 | 1.66 | 720.7 |
| VI | Epichlorohydrin | 42.79 | 54.43 | 2.78 | 1.68 | 711.5 |
| VII | n-Butyronitrile | 67.18 | 30.62 | 2.20 | 2.33 | 717.3 |
| VIII | Tetrahydrofurfuryl alcohol | 56.85 | 25.15 | 18.00 | 1.79 | 727.2 |
| IX | do | 56.00 | 34.72 | 9.28 | 1.95 | 727.0 |
| X | do | 25.72 | 73.33 | 0.95 | 1.37 | 723.0 |
| XI | do | 62.47 | 37.33 | 0.20 | 1.81 | 723.9 |

[1] Relative volatility was calculated for 1,1,1-trichloroethane relative to 1,2-dichloroethane.

The following additional examples using tetrahydrofurfuryl alcohol in a continuous system illustrate in detail the practice of the invention.

EXAMPLE XII

The equipment employed consisted of a 2000 ml. three-necked flask for a reboiler. Provision was made for constant removal of bottoms product with rate and temperature measurement. A 20-tray vacuum jacketed 1-inch glass, Oldershaw column was attached to the flask. A vacuum jacketed feed inlet section was attached to the top of the 20-tray section. A 10-tray vacuum jacketed 1-inch Bruun, glass bubble cap column was installed on top of the feed section. Another vacuum jacketed feed inlet section was placed on top of the ten tray section. A vacuum jacketed liquid dividing automatic head was joined to the top of the uppermost feed section. The reflux ratio was controlled by a timer. The two feed streams were preheated to the temperature of the material refluxing in the column.

Tetrahydrofurfuryl alcohol was fed at the top feed inlet at 268 grams per hour. The chlorinated hydrocarbon feed was a mixture of 95.9 weight percent 1,1,1-trichloroethane and 4.1 weight percent 1,2-dichloroethane. This was metered into the lower feed inlet at 56 grams per hour. The bottoms product was removed at the rate of 270 grams per hour. The overhead product was removed at a reflux ratio of 3:1 and a rate of 54 grams per hour. After several hours of operation and establishment of steady state, analysis showed the overhead composition to be 98.7 weight percent 1,1,1-trichloroethane, 0.8 weight percent 1,2-dichloroethane and 0.5 weight percent tetrahydrofurfuryl alcohol. The bottoms product contained less than 0.1 weight percent 1,1,1-trichloroethane, 1.0 weight percent 1,2-dichloroethane and the balance was tetrahydrofurfuryl alcohol.

EXAMPLE XIII

The same equipment employed in Example XII was used in this experiment except the 10-tray Bruun bubble cap column was replaced with a 10-tray Oldershaw column. The column was operated the same as in Example XII except that a reflux ratio of 4:1 was used. Tetrahydrofurfuryl alcohol was again employed as the extractant and the feed rates were very nearly the same as used in Example XII. After equilibrium was established, samples of the overhead and bottoms products were taken. Analysis showed the overhead composition to be 99.1 weight percent 1,1,1-trichloroethane, 0.3 weight percent 1,2-dichloroethane and 0.6 weight percent tetrahydrofurfuryl alcohol. The bottoms product contained 1.8 weight percent 1,1,1-trichloroethane, 12.5 weight percent 1,2-dichloroethane and 85.7 weight percent tetrahydrofurfuryl alcohol. The overall column efficiency was estimated at 50 percent and the calculated average relative volatility over the entire range of composition was 1.58.

We claim:

1. Method for the separation and recovery of 1,1,1-trichloroethane from chlorohydrocarbon impurities contained therein comprising the steps of:
   a. introducing in a distillation zone into a distillation mixture of 1,1,1-trichloroethane and chlorohydrocarbon contaminants an extractive amount of extraction solvent selected from the group consisting of n-butyronitrile, and tetrahydrofurfuryl alcohol;
   b. distilling said mixture to separate a 1,1,1-trichloroethane enriched vapor therefrom; and
   c. condensing said enriched vapor to recover purified 1,1,1-trichloroethane.

2. The method of claim 1 in which the proportion of said extraction solvent ranges from about 25 percent to about 85 percent by weight relative to the 1,1,1-trichloroethane present.

3. The method of claim 2 in which said extraction solvent enriched with chlorohydrocarbons is removed from the system and the solvent is separated and recycled to the distillation mixture.

4. The method of claim 1 which the extraction solvent is n-butyronitrile.

5. The method of claim 1 in which the chlorohydrocarbon contaminant is principally 1,2-dichloroethane.

6. Method for the separation and recovery of 1,1,1-trichloroethane from chlorohydrocarbon impurities comprising principally 1,2-dichloroethane, contained therein, comprising the steps of:
   a. introducing into a distillation mixture of 1,1,1-trichloroethane and said chlorohydrocarbon impurities an extractive amount of tetrahydrofurfuryl alcohol as an extraction solvent;
   b. distilling said mixture to separate a 1,1,1-trichloroethane enriched vapor therefrom; and
   c. condensing said enriched vapor to recover purified 1,1,1-trichloroethane.

* * * * *